(12) United States Patent
Chang et al.

(10) Patent No.: US 9,388,045 B2
(45) Date of Patent: *Jul. 12, 2016

(54) SYNTHESIS AND CHARACTERIZATION OF LITHIUM NICKEL MANGANESE COBALT PHOSPHOROUS OXIDE

(71) Applicant: Changs Ascending Enterprise Co., Ltd., Taichung (TW)

(72) Inventors: Chun-Chieh Chang, Ithaca, NY (US); Tsun Yu Chang, Taichung (TW)

(73) Assignee: CHANGS ASCENDING ENTERPRISE CO., Situn District, Taichung (TW)

( * ) Notice: Subject to any disclaimer, the term of this patent is extended or adjusted under 35 U.S.C. 154(b) by 457 days.

This patent is subject to a terminal disclaimer.

(21) Appl. No.: 13/889,514

(22) Filed: May 8, 2013

(65) Prior Publication Data

US 2014/0335414 A1    Nov. 13, 2014

(51) Int. Cl.

| H01M 4/00 | (2006.01) |
| C01B 25/45 | (2006.01) |
| H01M 4/58 | (2010.01) |
| H01M 4/1397 | (2010.01) |
| H01M 4/04 | (2006.01) |
| H01M 4/1391 | (2010.01) |
| H01M 4/36 | (2006.01) |
| H01M 10/0525 | (2010.01) |

(52) U.S. Cl.
CPC .............. *C01B 25/45* (2013.01); *H01M 4/0404* (2013.01); *H01M 4/0435* (2013.01); *H01M 4/0471* (2013.01); *H01M 4/1391* (2013.01); *H01M 4/1397* (2013.01); *H01M 4/5825* (2013.01); *H01M 4/366* (2013.01); *H01M 10/0525* (2013.01); *Y02E 60/122* (2013.01)

(58) Field of Classification Search
CPC .. C01B 25/45; H01M 4/0404; H01M 4/0435; H01M 4/0471; H01M 4/1391; H01M 4/1397; H01M 4/5825; H01M 4/366; H01M 10/0525
See application file for complete search history.

(56) References Cited

U.S. PATENT DOCUMENTS 5,198,081 A * 3/1993 Kanoh ...................... C25C 1/02
                                                                    205/560
2007/0281212 A1   12/2007 Thackeray et al.

FOREIGN PATENT DOCUMENTS

| EP | 1808918 A1 | 7/2007 |
| WO | 2012038412 A1 | 3/2012 |

OTHER PUBLICATIONS

International Search Report for PCT/IB2014/001067 mailed Aug. 17, 2015.

* cited by examiner

*Primary Examiner* — Milton I Cano
*Assistant Examiner* — Jimmy K Vo
(74) *Attorney, Agent, or Firm* — Thomas | Horstemeyer, LLP (57) ABSTRACT

Disclosed herein are certain embodiments of a novel chemical synthesis route for lithium ion battery applications. Accordingly, various embodiments are focused on the synthesis of a new active material using NMC (Lithium Nickel Manganese Cobalt Oxide) as the precursor for a phosphate material having a layered crystal structure. Partial phosphate generation in the layer structured material stabilizes the material while maintaining the large capacity nature of the layer structured material.

8 Claims, 15 Drawing Sheets

SYNTHESIS AND CHARACTERIZATION OF LITHIUM NICKEL MANGANESE COBALT PHOSPHOROUS OXIDE

TECHNICAL FIELD

The present disclosure is generally concerned with processing techniques for materials synthesis for lithium ion batteries.

BACKGROUND

Conventional phosphate materials (e.g., $LiFePO_4$, $LiMnPO_4$) are structurally stable materials that do not exhibit decomposition of the material when charged to high voltages (e.g., higher than 4.5V). The structure stability is also reflected by the fact that very small or no exothermic reactions are observed when heated to high temperatures without the presence of lithium residing in the structure. However, the phosphate materials do exhibit smaller theoretical capacity (around 170 mAh/g) and lower electrical conductivity. As a result, conventional phosphate material is restrictive or picky on the synthesis conditions and electrode preparation methods for lithium ion battery applications.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of certain embodiments of the present disclosure. Moreover, in the drawings, like reference numerals designate corresponding parts throughout the several views.

DETAILED DESCRIPTION

Disclosed herein are certain embodiments of a novel chemical synthesis route for lithium ion battery applications. Accordingly, various embodiments are focused on the synthesis of a new active material using NMC (Lithium Nickel Manganese Cobalt Oxide) as the precursor for a phosphate material having a layered crystal structure. Partial phosphate generation in the layer structured material stabilizes the material while maintaining the large capacity nature of the layer structured material.

For comparison, conventional phosphate materials (e.g., $LiFePO_4$, $LiMnPO_4$) are structurally stable materials that do not exhibit decomposition of the material when charged to high voltages (e.g., higher than 4.5V). The structure stability is also reflected by the fact that very small or no exothermic reactions are observed when heated to high temperatures without the presence of lithium residing in the structure. However, the phosphate materials do exhibit smaller theoretical capacity (around 170 mAh/g) and lower electrical conductivity. In contrast, the layer structured materials exhibit higher theoretical capacity (around 270 mAh/g) with better materials intrinsic electrical conductivity.

Figure 1A:
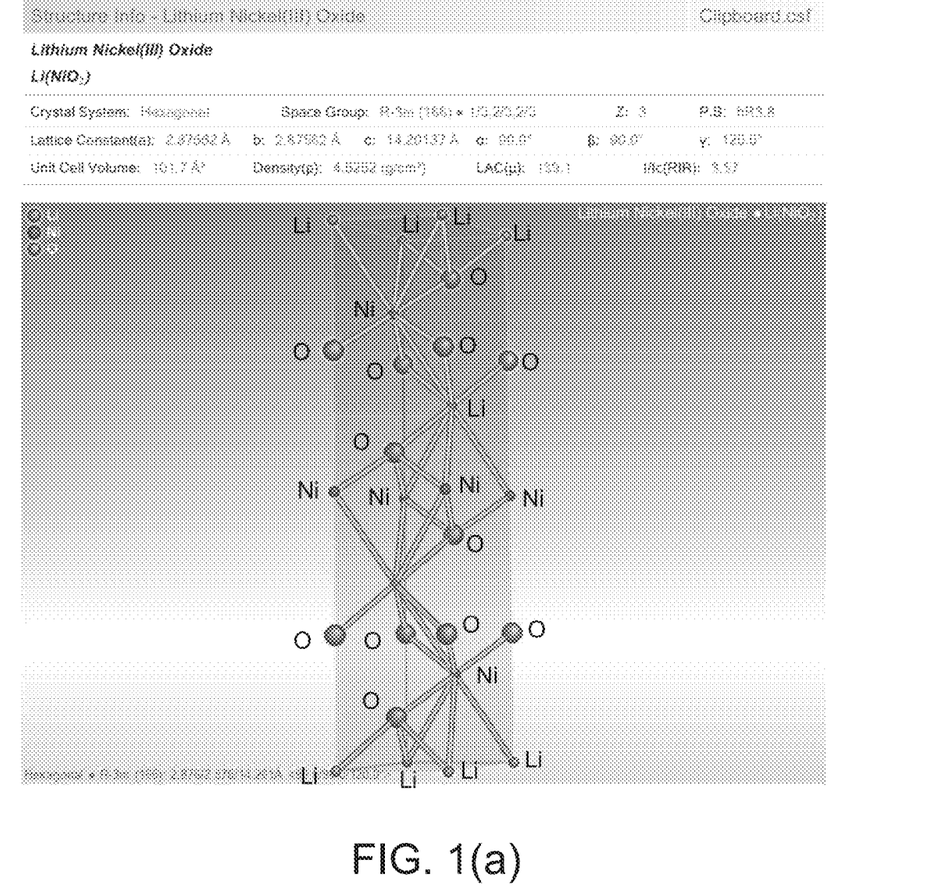
FIG. 1(a) is an illustrative view of a crystal structure of a conventional structured $LiNiO_2$.
Figure 1B:
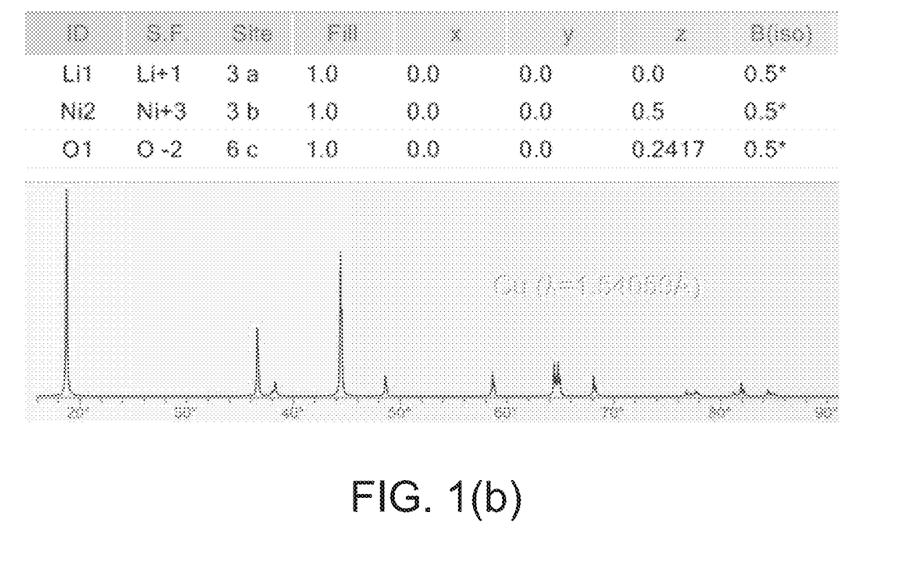
FIG. 1(b) is a diagram of an X-Ray Diffraction pattern for $LiNiPO_2$ in accordance with embodiments of the present disclosure.
Figure 1C:
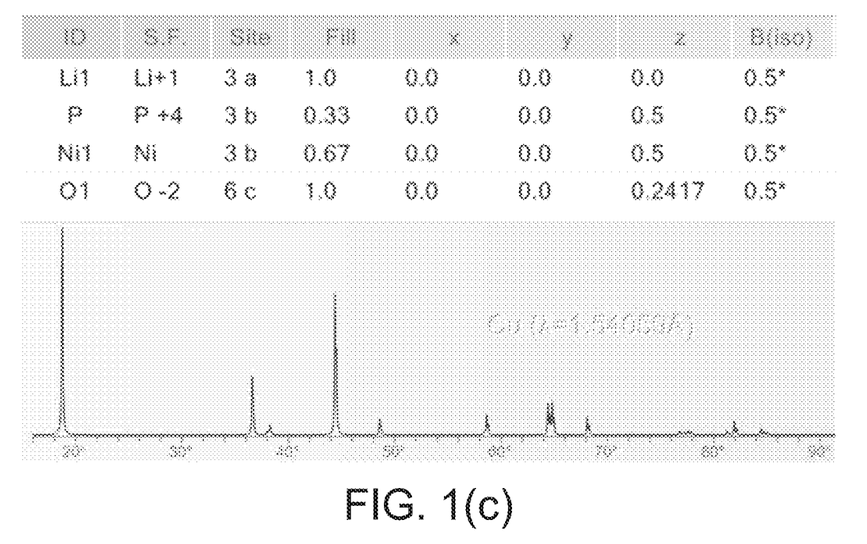
FIG. 1(c) is a diagram of an X-Ray Diffraction pattern for $Li_3Ni_2PO_6$ in accordance with embodiments of the present disclosure.

In accordance with an embodiment of the present disclosure, a targeted phosphate material is $Li_3Ni_2PO_6$ (⅓ of the transition metal sites are replaced by phosphorous) and its derivatives (less than ⅓ of transition metal sites are replaced by phosphorous). This material has a higher theoretical capacity of 305 mAh/g. Meanwhile, this new class of material can be modified to stabilize the layer structured material by incorporating a different amount of phosphate (or phosphorous oxide) that renders this new class of material as exhibiting high capacity and safety dual characteristics. As an example, the crystal structure (only 1 unit cell) of conventional layer structured $LiNiO_2$ is shown for illustration in FIG. 1(a). A total of 12 atom layers are repeated in the Li—O—Ni—O order. If ⅓rd of the Ni sites are replaced by the phosphorous atoms, the material will be $Li_3Ni_2PO_6$ as mentioned earlier. If ⅙th of the Ni sites are replaced by the phosphorous atoms, the material will become $Li_3Ni_{2.5}P_{0.5}O_6$ (i.e., $Li_6Ni_5PO_{12}$), and so on. For simplicity, a general formula may be given as $LiNi_{(1-x)}P_xO_2$ for this new class of material. The phosphorous will range from 0.33 to 0.01. The simulated XRD (X-Ray Diffraction) patterns for $LiNiPO_2$ and $Li_3Ni_2PO_6$ are shown in FIG. 1(b) and FIG. 1(c), respectively, for illustrating the iso-structural nature of the phosphorous replaced material. Further, from the enclosed experimental results, it is also apparent to synthesize materials with general formula of $Li_xX_{2/3+y}P_{1/3-y}O_2$, $0 \leq x \leq 1$, $0.001 \leq y \leq 0.33$, where X can be Ni or a combination of transition metal elements, such as Cobalt, Nanganese, Nickel, etc.

For one embodiment, NMC material (Lithium Nickel Manganese Cobalt oxide, $LiNi_{1/3}Mn_{1/3}Co_{1/3}O_2$) is particularly chosen as the synthesis starting material (i.e., precursor). A reason, among others, is to leach out Manganese in the solution state that could expedite the diffusion of Phosphorous ions (or phosphate ions) to the original positioned residing Mn ions. Furthermore, the leached Mn can be re-grown on the surface of the skeletal material (the material being leached) and ensure good electrical conductivity of the synthesized material.

Figure 2:
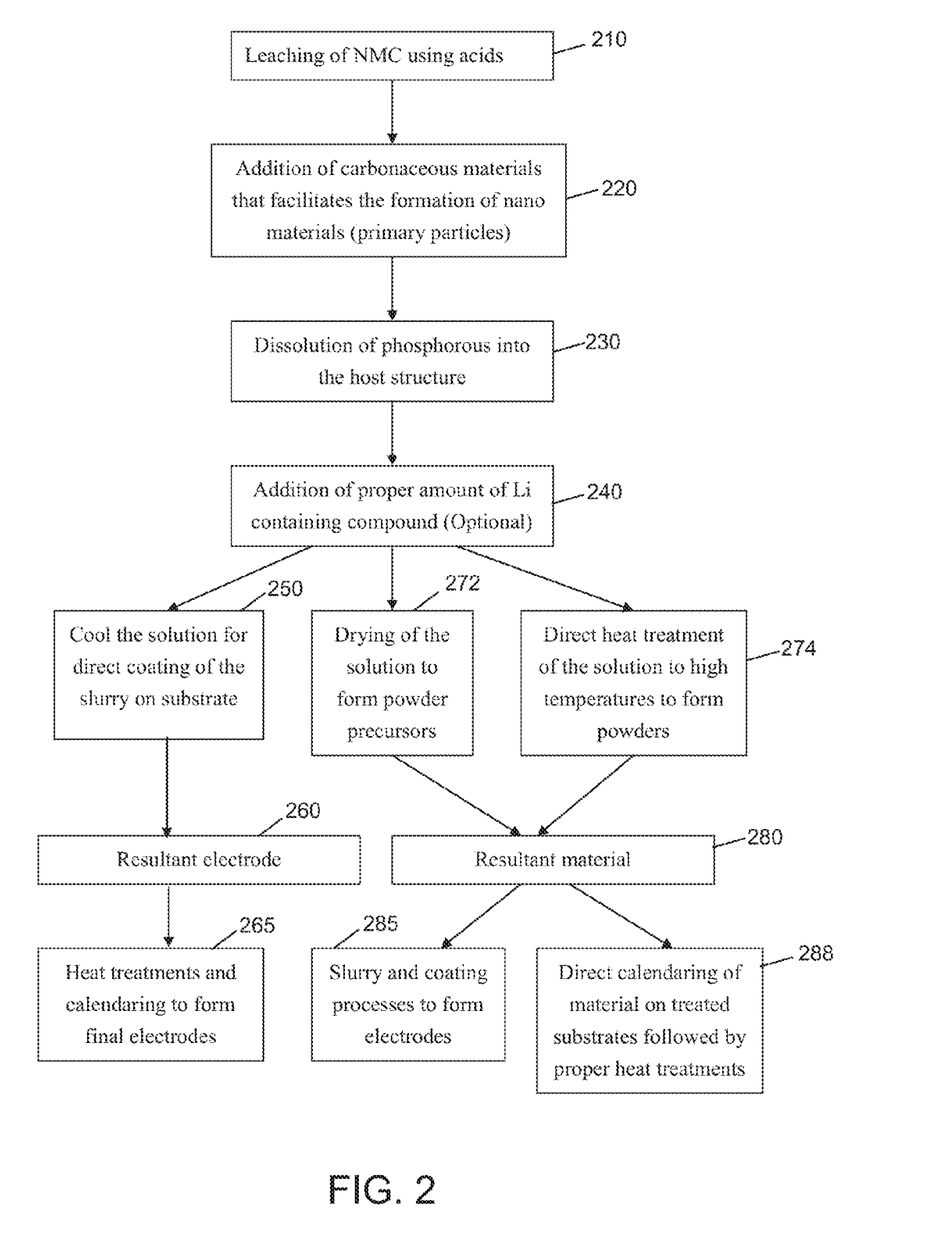
FIG. 2 is a flow chart diagram depicting an exemplary synthesis process for phosphate material in accordance with embodiments of the present disclosure.

FIG. 2 shows the general synthesis steps utilized in an exemplary embodiment of the present disclosure. To begin, NMC is leached (210) using acids. Next, the addition of carbonaceous materials facilitates (220) the formation of nano materials (primary particles). Then, phosphorous is dissolved (230) into the host structure, and a proper amount of lithium (Li) containing compound may be optionally added (240). To form (260) a resultant electrode, the resulting solution is cooled (250) for direct coating of the slurry on a substrate. After which, heat treatments and calendaring may be applied to form (265) final electrodes.

Alternatively, to form a resultant material (280), the resulting solution may be dried (272) to form powder precursors, or direct heat treatment (to high temperatures) may be applied (274) to the resulting solution to form powders. After which, slurry and coating processes may be applied to form (285) electrodes. Alternatively, direct calendaring of the resultant material on treated substrates followed by proper heat treatments may be performed (288).

For clarity, exemplary synthesis routes are described using the following examples, in accordance with embodiments of the present disclosure.

Example 1

Characterization of the Occurrence of the Phosphorous Replaced Layer Structured Material with General Formula of $Li_xNi_{1/4}Mn_{1/4}Co_{1/4}P_{(1/4-y)}O_2$ 1. Initially, dissolve oxalic acid (22.5 g (0.25 mole)) in CMC (carboxymethyl cellulose 1 wt % solution) (40 g) at 80° C.
2. Add $LiNi_{1/3}Mn_{1/3}CO_{1/3}O_2$ (97 g (1 mole)) to the solution. At this time, purplish foam evolves implying the dissolution of Mn into the solution. Keep the solution at 80° C. for two more hours until reaction is completed.

Remarks: Step 1 and 2 are used for leaching Mn from $LiNi_{1/3}Mn_{1/3}CO_{1/3}O_2$. The acid used in step 1 is not limited to oxalic acid. Formic acid, acetic acid, hydrochloric acid, or nitric acid may also be used. However, organic acids are preferred in certain embodiments.

3. Add proper amount of carbonaceous materials. In this case, sucrose (67.5 g) was added into the solution. React for 2 more hours.

Remarks: Step 3 is used in facilitating the formation of nano crystalline materials. The carbonaceous material is not limited to sucrose. Methyl cellulose (MC), Methylcarboxylmethyl cellulose (CMC), Cellulose acetate, starch, or styrene butadiene rubber may be used in achieving the same goal.

4. Then, titrate phosphoric acid (38.3 g (0.33 mole, 85% in $H_3PO_4$ content)) to the solution slowly (in half an hour).
5. Cool down the solution. At this moment, the solution is good for direct coating on Al foil or can be dried to form powders for later on reaction. That is, the solution can be used in making the electrode directly or can be used in making powder materials.

In the case of direct coating process, since manganese oxalate (transition metal source), phosphate ions (phosphorous source), and aluminum substrates (aluminum source) are all present, the coated solution can adhere to the substrate when heat treated to high temperatures, as described in U.S. patent application Ser. No. 13/865,962, entitled "Methods and System for Making an Electrode Free from a Polymer Binder," which is incorporated herein by reference in its entirety.

Figure 3A:
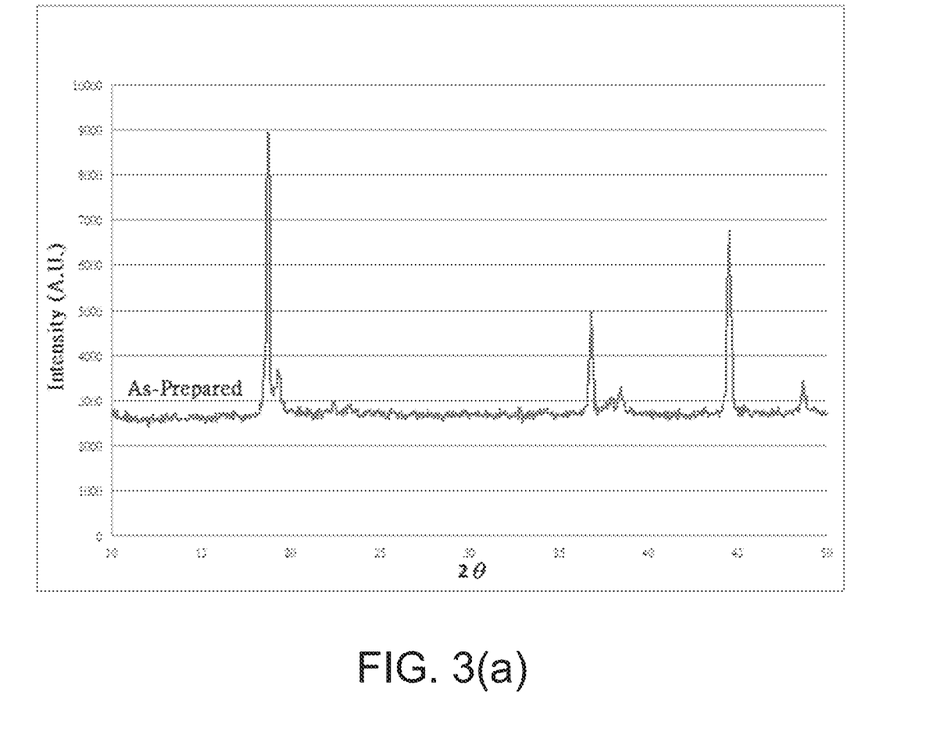
FIGS. 3(a)-3(b) are diagrams illustrating results of an examination of synthesized materials using X-ray diffraction in accordance with embodiments of the present disclosure.
Figure 3B:
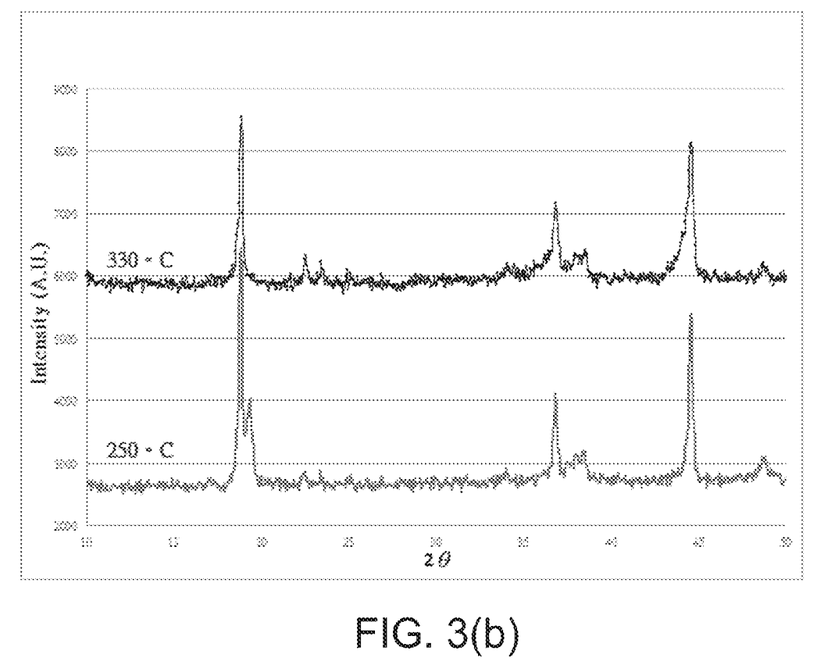

In the case of powder formation process, the methods in drying the solution can be flexible. This is usually conducted at 150° C. for several hours. FIG. 3(a) and FIG. 3(b) show the XRD data for the as-prepared powder (dried at 150° C.) being heat treated at 250° C. and 330° C. separately for 4 hours in air. From FIG. 3(a) it can be seen that the resultant material consists of two layer structured materials with different lattice parameters. With the sample being heat treated at 330° C., the two (003) peaks merged into only one broadened peak as a new material. This new material can be described with the following reactions:

with the creation of 25% Li vacancies or with the creation of 100% Li vacancies.

Since trace $Li_3PO_4$ is observed in the resultant material, it may be concluded that the resultant material is between the two extreme cases (i.e., partial phosphorous incorporated layer structured material) with residual $Li_3PO_4$.

It should be mentioned that no olivine structured materials were observed from the XRD data. So, the occurrence of layer structured, partial replacement of transition metal sites with phosphorous ions can be concluded as the structure of the resultant material. If a microscopic view is implemented in this example, one can also conclude that the resultant material is comprised of layer structured materials with different lattice parameters.

Example 2

Characterization of the Occurrence of Nano Crystalline Formation During the Transformation of NMC to $Li_xNi_{1/4}Mn_{1/4}CO_{1/4}P_{(1/4-y)}O_2$ 1. Initially, dissolve oxalic acid (22.5 g (0.25 mole)) in CMC (carboxymethyl cellulose 1 wt % solution) (40 g) at 80° C.
2. Add $LiNi_{1/3}Mn_{1/3}CO_{1/3}O_2$ (97 g (1 mole)) to the solution. At this time, purplish foam evolves implying the dissolution of Mn into the solution. Keep the solution at 80° C. for two more hours until reaction is completed.

Remarks: Step 1 and 2 are used for leaching Mn from $LiNi_{1/3}Mn_{1/3}CO_{1/3}O_2$. The acid used in step 1 is not limited to oxalic acid. Formic acid, acetic acid, hydrochloric acid, or nitric acid may also be used. However, organic acids are preferred in certain embodiments.

3. Add proper amount of carbonaceous materials. In this case, methyl cellulose (MC) (67.5 g) was added into the solution. React for 1 hour.
4. Add 30 g of n-Butanol for 3 more hours of reaction.

Remarks: Step 3 and 4 are used in facilitating the formation of nano crystalline materials. The carbonaceous material is not limited to sucrose. Methyl cellulose (MC), Methylcarboxylmethyl cellulose (CMC), Cellulose acetate, starch, or styrene butadiene rubber may be used in achieving the same goal.

5. Then, titrate phosphoric acid (38.3 g (0.33 mole, 85% in $H_3PO_4$ content)) to the solution slowly (in an hour).

Figure 4A:
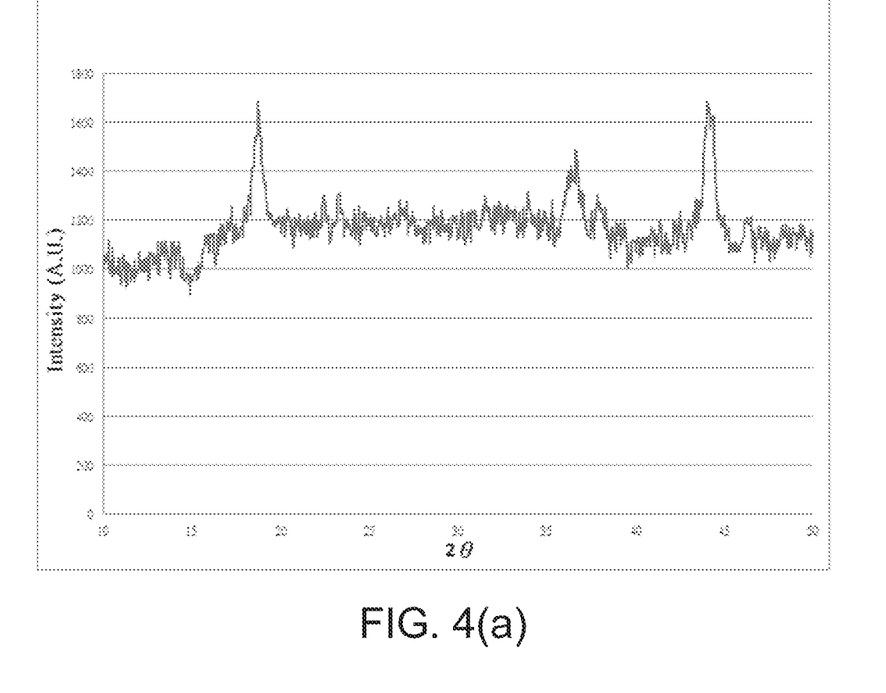
FIG. 4(a) is a diagram illustrating results of an examination of synthesized materials using X-ray diffraction in accordance with embodiments of the present disclosure.
Figure 4B:
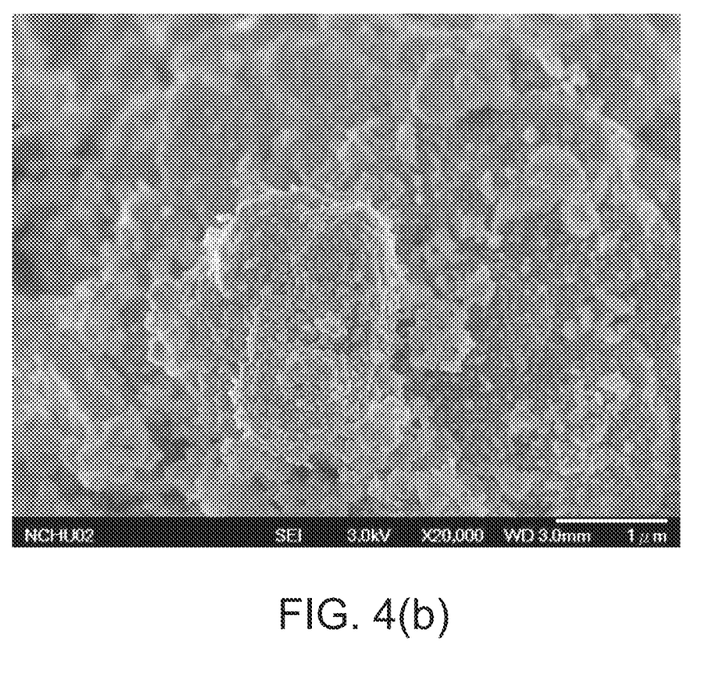
FIGS. 4(b)-4(d) are diagrams illustrating results of an examination of synthesized materials and precursor materials using scanning electron microscope for comparison analysis.
Figure 4C:
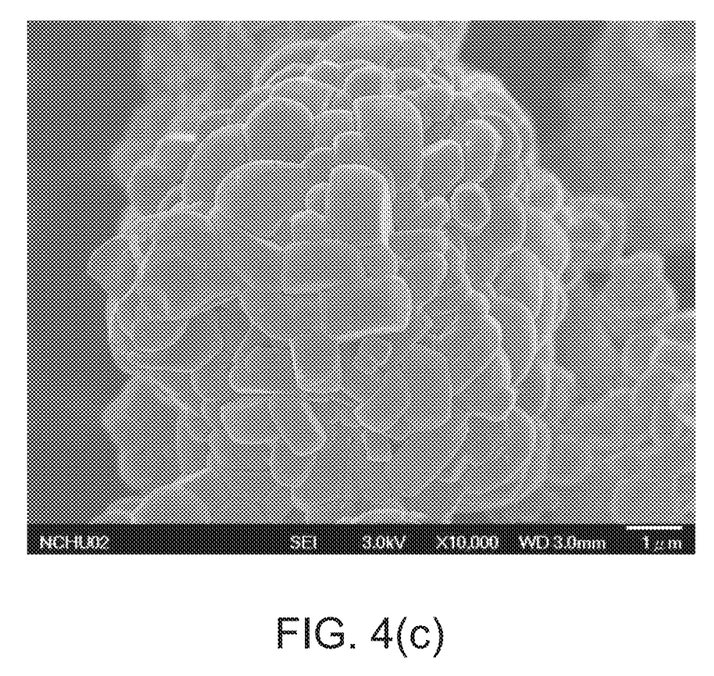

Remarks: Steps 5 was utilized in dissolving phosphorous into the structure. Then, the resultant slurry was transferred to a metallic aluminum boat and heat treated to 300° C. for 4 hours in air in a box furnace. The heat treated material's XRD data is shown in FIG. 4(a). Meanwhile, FIG. 4(b) and FIG. 4(c) are the SEM (scanning electron microscope) pictures representing the heat treated material (20kX) and the original NMC material (10kX) (before any treatment) for comparisons. It can be seen that the morphology of the heat treated materials is nano particles (primary particle) in nature, which is very different from the original NMC materials morphology.

Figure 4D:
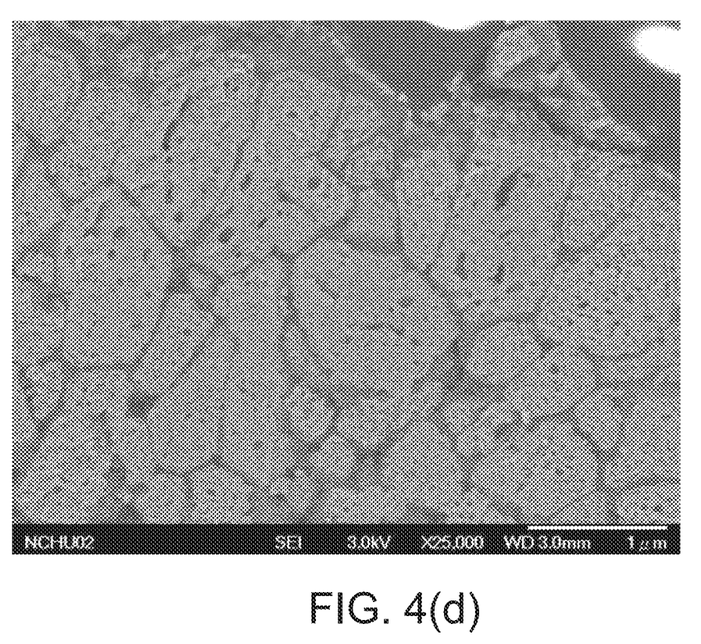

FIG. 4(d) is an additional SEM picture conducted by cross sectioning the heat treated material. It can be seen that the heat treated material is pretty much porous in nature which can be reflected by the physical data shown in Table 1 as the surface area has been increased from 0.4 to 6 m²/g.

TABLE 1

| | Particle size Data (um) | | | Surface Area Data |
|---|---|---|---|---|
| | D10 | D50 | D100 | (BET) ($m^2$/g) |
| $LiNi_{1/3}Mn_{1/3}Co_{1/3}O_2$ | 6.06 | 11.84 | 38.88 | 0.3867 |
| Heat Treated Material † | 6.08 | 12.84 | 42.69 | 6.0663 |

Physical properties of the precursor NMC ($LiNi_{1/3}Mn_{1/3}Co_{1/3}O_2$) and the Example 2 heat treated material (300° C. for 4 hours).
† Heat treated material was obtained after heat treating the sample at 300° C. for 4 hours.

Example 3

Synthesis and Characterization of $Li_xNi_{1/4}Mn_{1/4}Co_{1/4}P_{(1/4-y)}O_2$ with the Addition of Li Content 1. Initially, dissolve formic acid (47 g (1 mole)) in MC (Methyl cellulose 1 wt % water solution) (40 g) at 80° C.
2. Add $LiNi_{1/3}Mn_{1/3}CO_{1/3}O_2$ (97 g) (1 mole) to the solution. At this time, purplish foam evolves implying the dissolution of Mn into the solution. Keep the solution at 80° C. for two more hours until reaction is completed.

Remarks: Step 1 and 2 are used for leaching Mn from $LiNi_{1/3}Mn_{1/3}CO_{1/3}O_2$. The acid used in step 1 is not limited to formic acid. Oxalic acid, acetic acid, hydrochloric acid, or nitric acid may also be used. However, organic acids are preferred in certain embodiments.

3. Add proper amount of carbonaceous materials. In this case, methyl cellulose (MC) (20 g) was added into the solution. React for 1 hour.
4. Add 30 g of n-Butanol for 1 more hour of reaction.

Remarks: Step 3 and 4 are used in facilitating the formation of nano crystalline materials.

5. Then, titrate phosphoric acid (28.8 g (0.25 mole, 85% in $H_3PO_4$ content)) to the solution slowly (in an hour).
6. Prepare the solution containing lithium on the side by dissolving $Li_2CO_3$ (18.5 g) in formic acid/water (ratio 30 g/60 g) solution. 18.5 g $Li_2CO_3$ is equivalent to 0.5 mole of Li content.
7. Add the solution prepared in step 6 to the solution resulted from step 5.

Remarks: Step 5 was utilized in dissolving phosphorous into the structure and step 6 was used in increasing the lithium content (e.g., decreasing Li vacancies in the structure as mentioned in Example 1).

8. Then, increase the solution temperature from 80° C. (kept from step 1 to 6) to 110° C. for drying the solution. The dried xerogel was crushed into powder form to be ready for the following heat treatments.

Figure 5:
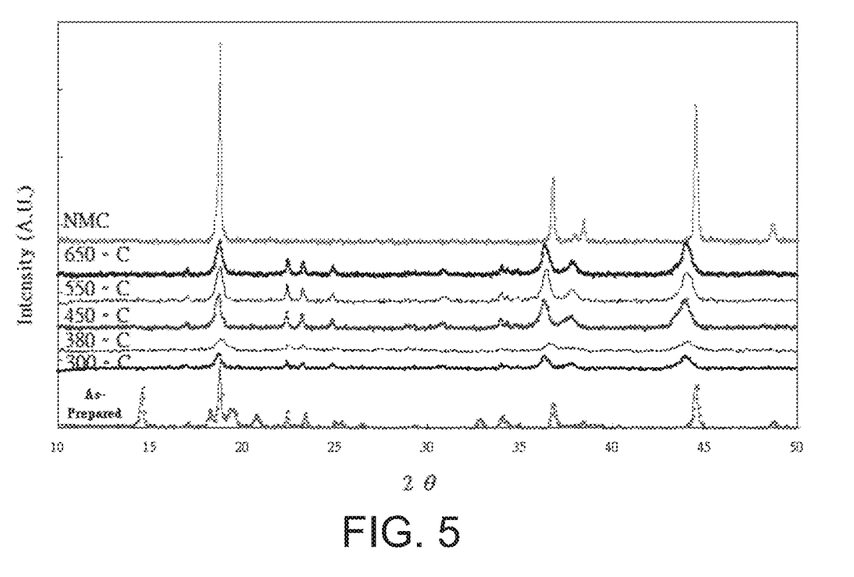
FIG. 5 is a diagram showing phase evolution data for synthesized materials during varying heat treatments in accordance with an exemplary embodiment of the present disclosure.

FIG. 5 shows the phase evolution data for the as-prepared powder and the samples being heat treated at 300° C., 380° C., 450° C., 550° C., and 650° C. separately for 4 hours in oxygen. Original NMC precursor is also placed for comparisons. From FIG. 5, it can be seen that the heat treated materials showed broadened peaks implying the formation of phosphorized material with new nano crystallines formed on the surface of the resultant materials. Before the heat treatments, the as-prepared powder shows a mixture of manganese formate (hydrated and non-hydrated) and the leached NMC materials. So, it is apparent that the newly formed nano crystalline materials can result from the formation of $LiMn_2O_4$, or nano (amorphous) $LiMnPO_4$ during the heat treatment processes. Other impurities such as $Li_3PO_4$ can be a consequence of excess or non-reacted lithium and phosphate ions.

From the data described in Examples 1, 2, and 3, several new findings may be mentioned. First, it can be concluded that during the processes disclosed in the present disclosure, the NMC material can be phosphorized. Second, during the formation of the phosphorized layer structured material, new nano crystallines can be formed on the surface of the precursor material with the presence of the porous structure of the final material. It is apparent that the porous structure is formed during the leaching process, and the leached material can re-grow onto the parent material in the form of nano crystalline materials. The broadening of the peaks can be comprehended as the result of the existence of phosphorized layer structured material and the newly formed nano materials. The newly formed nano materials are originated mainly from the presence of leached manganese (formate). Next, heat treatments to elevated temperatures (please refer to the phase evolution study shown in FIG. 5) does not change the peak broadening nature of the material implying the stability of the phosphorized phase can be maintained with the increase of temperature.

Accordingly, from the aforementioned examples, occurrence of phosphate material was observed corresponding to the general formula:

$Li_xNi_{1/4}Mn_{1/4}CO_{1/4}P_{(1/4-y)}O_2$, $0 \leq x \leq 1$, $0.001 \leq y \leq 0.25$.

The following examples may be used in characterizing the materials described above. Two exemplary methods used in making exemplary electrodes in accordance with the present disclosure are described.

Method 1

Conventional Method in Making the Slurry and Coating on the Aluminum Substrate

Example electrode preparation: Active material (5 g), Super P® (1 g) and SBR (Styrene-Butadiene Rubber) (0.3 g) were used in the slurry making. After coating using doctor blade, the coated electrode was dried at 110° C. for 3 hours followed by punching of the electrode. After vacuum drying again at 110° C. for overnight, the electrodes were transferred to the glove box for test cell assembly. The test cell was three-electrode design with Li as the reference electrode.

Method 2

Direct Formation of the Material on the Substrate

For example electrode preparation:
1. Load the active battery material on top of the as made substrate by spreading the active material powder through a 250 mesh sieve of a calendaring machine.
2. Pass the as made (active material loaded) electrode through the calendaring machine again for compacting the electrode.
3. Send the as made electrode to the box furnace for various heat treatments.
4. Punch the heat treated electrode and vacuum dry the samples at 110° C. for overnight. The dried electrodes were then transferred to the glove box for test cell assembly.

For substrate preparation:
i. Prepare 5M Phosphoric acid/n-Butanol solution (dissolve 23 g phosphoric acid and add n-Butanol to 40 ml in volume).
ii. Soak a substrate (Al plate) in the prepared solution that was kept at 50° C. for 2 minutes. Then, transfer the substrate to 100 ml n-Butanol for rinsing. After rinsing, keep the substrate upright and dry at 50° C.

iii. Allow MnO$_2$ powders to pass through a 250 mesh sieve and spread on the substrate. Then, take the loaded substrate for calendaring followed by a gentle heat treatment at 330° C. for 2 hours in air.

Example 4

Electrochemical characterizations for the electrodes were made using the as-prepared powders described in Example 3, followed by heat treating the electrode at 330° C. for 4 hours in air. The electrode was made using the method 2 described above in which an average of 5.3 mg of active material was loaded on the substrate.

Figure 6A:
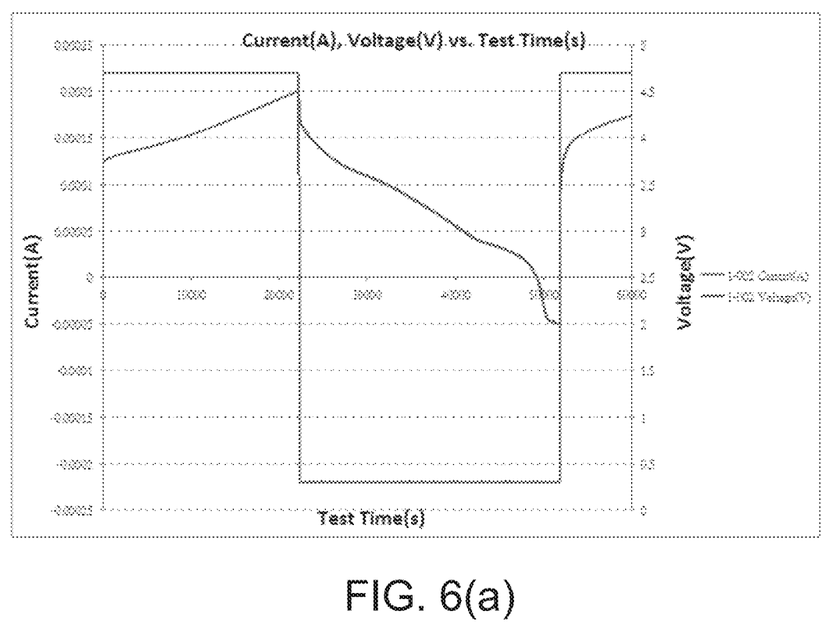
FIGS. 6(a)-(c) are diagrams showing electrochemical properties of exemplary electrodes in accordance with embodiments of the present disclosure.

For the exemplary electrode, a charge capacity of 251 mAh/g was observed. The first discharge capacity was calculated to be 334 mAh/g with two plateaus observed (please refer to FIG. 6(a)). The extremely high first discharge capacity could be attributed to the new nano crystalline material (oxides) formed on the surface of the skeletal material.

Example 5

Electrochemical characterizations for the electrodes were made using the as-prepared powders described in Example 3, followed by heat treating the electrode at 700° C. for 4 hours in oxygen. The electrode was made using the method 2 described above.

For the exemplary electrode, it was observed that the aluminum substrate was able to sustain a heat treatment of 700° C. under oxygen atmosphere. It should be noted that if the aluminum substrate is coated with active material on two sides, the aluminum substrate will be even stronger due to the strong oxidizing environment. In this case, an electrode with 2.1 mg loading of active material was tested.

Figure 6B:
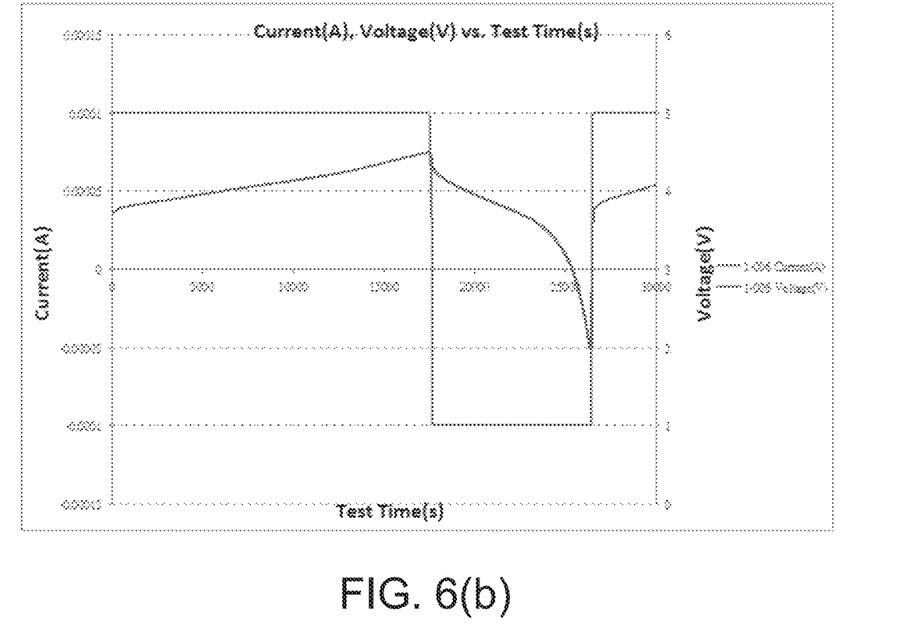

A charge capacity of 231.7 mAh/g was observed. The first discharge capacity was calculated to be 114.7 mAh/g with no obvious plateaus observed (please refer to FIG. 6(b)). The loss of charge capacity could be a result from the presence of the impurity phase observed shown in the phase evolution study.

Example 6

Electrochemical characterizations for the material synthesized using the as-prepared powders described in Example 3 were made by heat treating the as-prepared powders to 700° C. for 4 hours in oxygen. The electrode was made using the conventional slurry making and coating method as described in method 1.

Figure 6C:
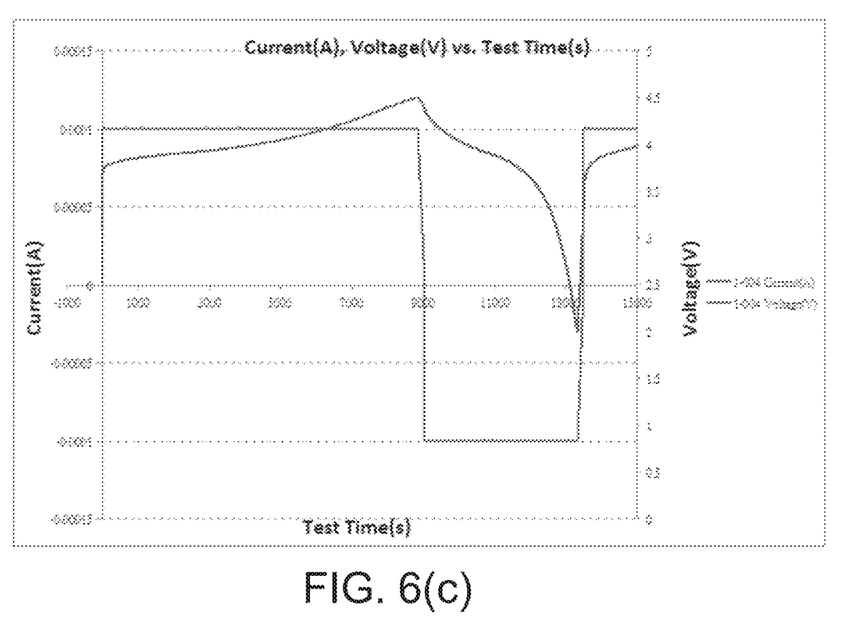

In this example, an electrode with 2.8 mg loading (using the recipe described in method 1, active material is 81%) was tested. A charge capacity of 108.5 mAh/g was observed. The first discharge capacity was calculated to be 52.6 mAh/g with no obvious plateaus observed (please refer to FIG. 6(c)). The shortage in capacity can be attributed to too small sample size used for the test. A corresponding c-rate of about c/3 was used for testing the sample.

Any process descriptions should be understood as representing steps in an exemplary process, and alternate implementations are included within the scope of the disclosure in which steps may be executed out of order from that shown or discussed, including substantially concurrently or in reverse order, depending on the functionality involved, as would be understood by those reasonably skilled in the art of the present disclosure.

Figure 7:
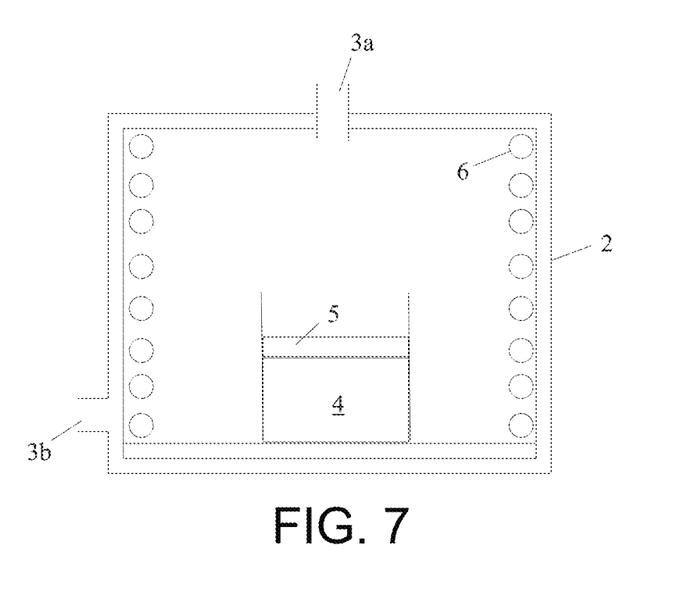
FIG. 7 is a diagram of an exemplary embodiment of a furnace and a heat treatment environment for the synthesis of materials in accordance with the present disclosure.

FIG. 7 shows the design of a furnace and a heat treatment environment for the synthesis of the materials presently disclosed. FIG. 7 shows reaction vessel 1, which is open to air in furnace 2. The furnace is open to the atmosphere at 3a and 3b so as to maintain substantially atmospheric pressure in the furnace. Flow of gases into or out of the furnace is dependent on heating and cooling cycles of the furnace and chemical reactions taking place with materials in the furnace. Air is free to enter the furnace, and air and/or products of a chemical reaction of materials 4 in the reaction vessel 1 are free to exit the furnace. Materials 4 in vessel 1 react chemically during heating steps to form cathode materials in accordance with the present disclosure. Materials 4 in vessel 1, which face air found in the furnace, are covered by a layer of a high temperature inert blanket 5, which is porous to air and escaping gases caused by the heating step. Heating coils of the furnace are indicated at 6.

It should be emphasized that the above-described embodiments are merely possible examples of implementations, merely set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

At least the following is claimed:

1. A process for producing lithium nickel manganese cobalt phosphorous oxide material comprising:
    leaching manganese from Lithium Nickel Manganese Cobalt Oxide (NMC) within a solution;
    facilitating formation of nano materials with addition of carbonaceous materials to the solution; and
    dissolving phosphorous within a resulting host structure of the solution.

2. The process according to claim 1, further comprising:
    cooling the resulting solution for direct coating of a slurry on an aluminum substrate;
    applying a heat treatment and calendaring to form an electrode comprising the lithium nickel manganese cobalt phosphorous oxide material.

3. The process according to claim 1, further comprising:
    drying or applying a direct heat treatment to the resulting solution to form a resultant active material powder.

4. The process according to claim 3, further comprising:
    direct calendaring the active material powder on an aluminum substrate to form a compacted electrode;
    applying a heat treatment to the compacted electrode; and
    drying the heated electrode to form a final electrode comprising the lithium nickel manganese cobalt phosphorous oxide material.

5. The process according to claim 4, wherein the heated electrode is treated at approximately 330° C. for approximately 4 hours in air.

6. The process according to claim 4, wherein the heated electrode is treated at approximately 700° C. for approximately 4 hours in oxygen.

7. The process according to claim 3, further comprising:
    applying a heat treatment to an aluminum substrate; and
    directly coating the heated substrate with the resultant active material powder to form a final electrode comprising the lithium nickel manganese cobalt phosphorous oxide material, wherein the resultant active material powder adheres to the heated substrate.

8. The process according to claim 1, further comprising:
    adding a lithium containing compound to the solution after the phosphorous is dissolved.

* * * * *